United States Patent
Homeier

(10) Patent No.: US 11,460,833 B2
(45) Date of Patent: Oct. 4, 2022

(54) MACHINING METHOD, DATABASE SERVER, SYSTEM, AND METHOD FOR SHARING DATA FOR MACHINING DEVICES BY MEANS OF A REMOTE DATA TRANSMISSION

(71) Applicant: HOMAG GmbH, Schopfloch (DE)

(72) Inventor: Achim Homeier, Pfalzgrafenweiler (DE)

(73) Assignee: HOMAG GMBH, Schopfloch (DE)

( * ) Notice: Subject to any disclaimer, the term of this patent is extended or adjusted under 35 U.S.C. 154(b) by 0 days.

(21) Appl. No.: 16/339,330

(22) PCT Filed: Sep. 27, 2017

(86) PCT No.: PCT/EP2017/074473
§ 371 (c)(1),
(2) Date: Apr. 3, 2019

(87) PCT Pub. No.: WO2018/065273
PCT Pub. Date: Apr. 12, 2018

(65) Prior Publication Data
US 2020/0041986 A1     Feb. 6, 2020

(30) Foreign Application Priority Data

Oct. 6, 2016   (DE) .................... 10 2016 219 371.6

(51) Int. Cl.
*G05B 19/418*     (2006.01)
(52) U.S. Cl.
CPC ............. *G05B 19/4188* (2013.01); *G05B 2219/31001* (2013.01); *G05B 2219/31323* (2013.01); *G05B 2219/36284* (2013.01)
(58) Field of Classification Search
CPC .......... G05B 2219/31001; G05B 2219/31323; G05B 2219/36284
(Continued)

(56) References Cited

U.S. PATENT DOCUMENTS

| | | | |
|---|---|---|---|
| 10,466,681 B1* | 11/2019 | Jones ............... | G05B 19/40937 |
| 2008/0210649 A1* | 9/2008 | Faust ................. | A47F 5/0807 |
| | | | 211/59.1 |

(Continued)

FOREIGN PATENT DOCUMENTS

| | | |
|---|---|---|
| DE | 102004013615 A1 | 10/2005 |
| DE | 202011000875 U1 | 3/2013 |

(Continued)

OTHER PUBLICATIONS

Albert, "Getting to Know Knowledge-Based Machining" Modern Machine Shop, 2002, accessed at https://web.archive.org/web/20130312132940/https://www.mmsonline.com/articles/getting-to-know-knowledge-based-machining , 7 page print out (Year: 2002).*

(Continued)

*Primary Examiner* — Emilio J Saavedra
(74) *Attorney, Agent, or Firm* — Nathan S. Smith; Morgan, Lewis & Bockius LLP

(57) ABSTRACT

System (1) for sharing device-related data by means of remote data transmission, in particular machining-specific parameters, of machining devices (30, 35), in particular wood machining devices, for machining of workpieces preferably consisting at least in sections of wood, wood material, synthetic material and/or glass, comprising: a main computer (15) for creating and providing a database (10) in which the device-related data can be managed, a first workstation (20) of a first machining device (30) which can be connected to the main computer (15) via a data communication link, and a second workstation (25) of a second machining device (35) which can be connected to the main computer via a data communication link, with device-related data being able to be stored in the database (10) of the main computer (15) by at least one of the two workstations (20, (Continued)

25) and thereby being able to be made available for the other of the two workstations (20, 25).

11 Claims, 1 Drawing Sheet

(58) Field of Classification Search
USPC .......................................................... 700/96
See application file for complete search history.

(56) References Cited

U.S. PATENT DOCUMENTS

| 2009/0110499 | A1* | 4/2009 | Inagaki | ............. | B23Q 17/0976 |
| | | | | | 408/143 |
| 2012/0303674 | A1* | 11/2012 | Boensch | ............... | G06F 16/252 |
| | | | | | 707/802 |
| 2013/0119036 | A1 | 5/2013 | Daniel | | |
| 2013/0184839 | A1* | 7/2013 | Bauer | .................... | G05B 15/02 |
| | | | | | 700/83 |
| 2016/0167186 | A1* | 6/2016 | Chan | ......................... | B25F 5/00 |
| | | | | | 173/2 |
| 2016/0243640 | A1 | 8/2016 | Albrecht | | |
| 2017/0139403 | A1* | 5/2017 | Saitou | .............. | G05B 19/40938 |
| 2017/0182612 | A1* | 6/2017 | Balaji | ................ | B23Q 17/0952 |
| 2018/0032058 | A1* | 2/2018 | Mizuno | .............. | G05B 19/4097 |

FOREIGN PATENT DOCUMENTS

| DE | 102012206712 A1 | 10/2013 | | |
| DE | 102009000938 B4 * | 5/2015 | ........... | B29C 45/766 |
| DE | 102014208980 A1 | 7/2015 | | |
| JP | 2006107073 A * | 4/2006 | | |
| WO | WO-2015015015 A1 * | 2/2015 | ........... | B24B 23/028 |
| WO | WO 2016033568 A1 | 3/2016 | | |

OTHER PUBLICATIONS

Tolouei-Rad, "An intelligent approach to high quantity automated machining", Journal of Achievements in Materials and Manufacturing Engineering, vol. 47 Iss. 2, Aug. 2011, pp. 195-204 (Year: 2011).*

Rubio et al., "Model-based expert system to automatically adapt milling forces in Pareto optimal multi-objective working points", Expert Systems with Applications 40 (2013) pp. 2312-2322 (Year: 2013).*

* cited by examiner

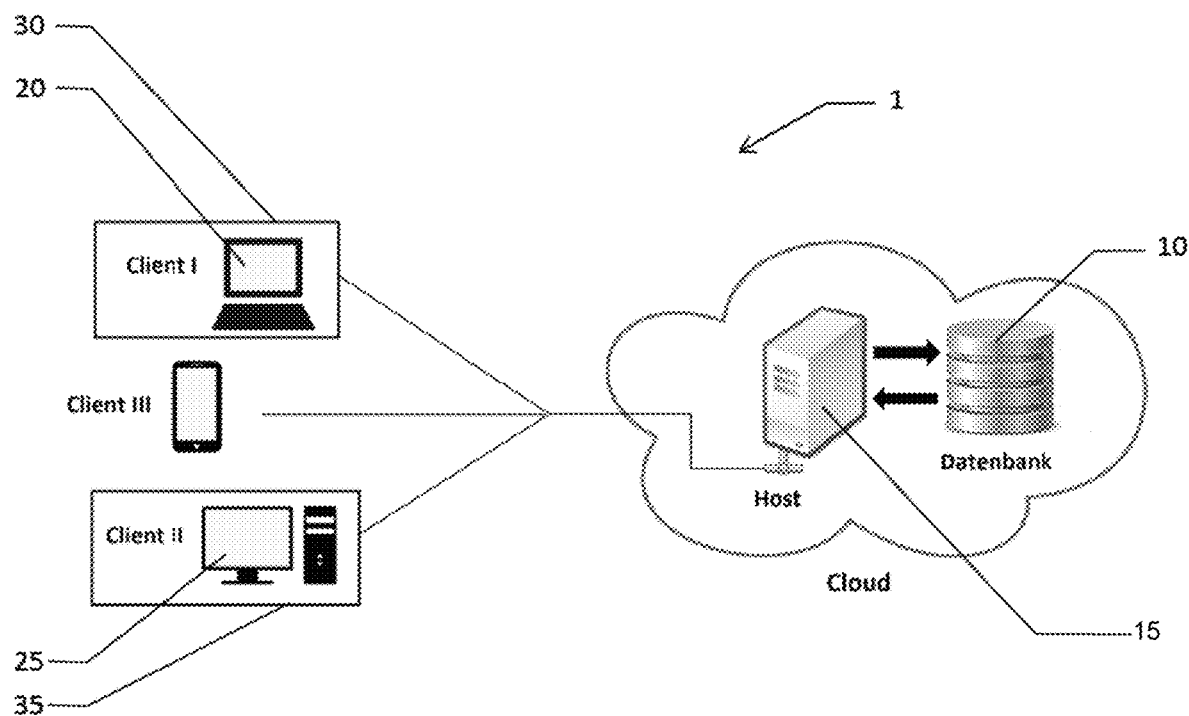

MACHINING METHOD, DATABASE SERVER, SYSTEM, AND METHOD FOR SHARING DATA FOR MACHINING DEVICES BY MEANS OF A REMOTE DATA TRANSMISSION

FIELD OF THE INVENTION

The invention relates to a machining device, a database server, a system and a method for sharing data for machining devices, in particular wood machining devices, by means of a remote data transmission.

PRIOR ART

In the field of machining devices, in particular with wood machining devices, there is a need, due to the large variance in materials to be machined and processed, in particular inhomogeneous solid woods and wood materials, to carry out tests with different tools, machining parameters such as, for example, different feeds, rotational speeds, temperatures, material quantities (quantity of paint) and excipients such as, for example, glue, in order to achieve good and particularly reproducible work results. This often means that a lot of time is lost in procuring suitable tools, materials and the like. Furthermore, there is the problem with small batches that the collected experiences are often only available to one or a few operators of a machining device within a company. Furthermore, the experience values are generally not systematically recorded and made available to other users. Furthermore, cross-company systematic recording and evaluation of such experience values does not take place either.

Often it is only possible to fall back on indications in the specialist literature, which are, however, only sparsely available, often outdated, and in many cases cannot keep pace with the rapid development of new materials. This means that the individual operator only has access to his own experience and, to a lesser extent, in-house knowledge or knowledge from suppliers providing the newly developed material. Accordingly, there is a great need to create an opportunity to make fixture-related data, in particular machining-specific parameters, available and exchange between companies in order to improve machining quality, simplify setting processes and reduce machining costs, in particular product start-up costs.

On the other hand, machine data has recently been recorded sporadically and arbitrarily, especially by machine manufacturers. In most cases, this is used for maintenance purposes of the machines and only to a limited extent for internal further development of the machines. In such cases, often only the load on the machine and the machining operations that are primarily carried out are recorded in order to further develop the own machines based on the ascertained data. The further development of new machining devices is therefore often only based on known standard applications, with important trends or changes in the use behavior of the user not being recognized or being recognized too late. In most cases, such types of information are not systematically transmitted and collected, but rather often exchanged personally with the customer by maintenance or sales personnel.

DESCRIPTION OF THE INVENTION

The object of the present invention is therefore to provide a system and a method by which device-related data of machining devices, in particular wood machining devices, can be shared in an uncomplicated and secure manner between at least two operators of machining devices via a remote data transmission.

The object is solved by a machining device according to claim 1, a database server according to claim 7, a system according to claim 8, as well as a method according to claim 20. Preferred further developments of the invention are given in the dependent claims.

One of the core ideas of the present invention is to create a database on the basis of a main computer and to make it available by means of remote data transmission (cloud based), so that at least two workstations of two different machining devices can access it, with at least one of the two workstations storing device-related data in the database of the main computer, whereby these become available for the other of the two workstations.

Consequently, by means of the proposed system, an operator or a workstation of a machining device can always easily and securely access device-related data of another machining device stored in a database and which have been made available in this manner.

In the present invention, the term "machining device" means, in addition to the classic shaping machining device such as, for example, a separating machining device, a cutting device, and the like, also a device with which, for example, substances are applied to a workpiece such as, for example, a painting device, coating device, and the like.

According to the present invention, a machining device, wood machining device, for machining workpieces preferably consisting at least in sections of wood, wood material, synthetic material and/or glass has: at least one functional unit for carrying out a function in the machining device, and a data communication connection configured to receive device-related data from an external database to make it available to an operator of the machining device and/or to provide it to the at least one functional unit, with a control or selection of the at least one functional unit being based on the received device-related data.

In this way, a machining device is provided which is capable of making this device-related data available to an operator of the machining device and/or a functional unit which receives this device-related data which it receives from an external database, thereby enabling the machining device to be set up more quickly. Set-up means that an unknown, previously unperformed machining is carried out on the machining device and that therefore no machining parameters (setting parameters) are known. This can be the case, for example, if a new material, a new tool or a new processing material such as paint, glue, adhesive, etc. is machined, processed or used.

Preferably, the at least one functional unit is a processor, with the processor using the device-related data to control the machining device.

Furthermore, the at least one functional unit can be a tool or a machining aggregate such as, for example, a spray head, a coating aggregate, a hot air aggregate, etc. with the tool of the machining aggregate being selected or controlled on the basis of the device-related data.

In a further embodiment, the machining device is configured to query the device-related data by tool type, tool number, workpiece parameter, device type, and/or manufacturer from the external database server.

The data communication link is further preferably configured to transfer device-related data collected at the machining device to the external database.

In this way, it is possible to collect device-related data from across companies or even between companies, and thus exchange it between different machining devices. This allows a machining device or an operator of a machining device to access more device-specific data, significantly improving the chances of finding necessary data in the external database.

Moreover, the machining device can have at least one workpiece detection unit, by means of which workpiece parameters such as elasticity modulus, density, thickness, layer thickness, etc. are preferably non-destructively detected. On the basis of the detected workpiece parameters, at least a pre-selection of the device-related data made available by the external database can be made. The non-destructive inspection or detection can be carried out using ultrasound, X-rays, acoustic resonance analysis, visual inspection and the like. If, for example, the workpiece detection unit detects that the workpiece to be machined is a very inhomogeneous lightweight wood, the external database can already be searched or filtered accordingly. In other words, only parameter sets for light wood, especially inhomogeneous light wood, are displayed to the operator.

According to the present invention, the system for sharing device-related data by means of remote data transmission, in particular machining-related parameters, of machining devices, in particular wood machining devices, for machining workpieces preferably consisting at least in sections of wood, wood material, synthetic material and/or glass, has: a main computer which is also designated as "Host" and serves to create and provide a database in order to be able to manage the device-related data, a first workstation which is also designated as "Client I" and which can be connected via a data communication connection with the main computer, and a second workstation which is also designated as "Client II" and which can also be connected via a data communication connection with the main computer, with device-related data being able to be stored in the database of the main computer via one of the two workstations and thereby being able to be made available to the two workpieces. It is obvious that an arbitrary number of workstations can be connected to the main computer via respective data communication connections, with which the database can be as extensive as desired.

In this way, a system for sharing device-related data by means of remote data transmission is provided with which any number of operators or workstations from different or independent machining devices, in particular wood machining devices, can share or exchange device-related data, in particular machining-specific parameters. The amount of available device-related data stored in the database thereby grows faster the more that and more often individual operators or workstations store their data in the database. The individual operator or workstation has access to correspondingly more device-specific data through the system.

Preferably, the main computer of the system for sharing device-related data by means of remote data transmission is a web server of a machine manufacturer or manufacturer of machine components, which has a World Wide Web address and creates an internet connectivity by means of which the device-specific data can be transmitted, shared or exchanged between the customer's workstations and the web server. The web server makes the database available in a cloud, so to speak, which the individual workstations can access and share or exchange their data in a cloud-based manner.

Consequently, it is possible, for example, for a machine manufacturer to provide a web server on which the database can be set up, managed and maintained, and for the respective customers of the machine manufacturer that have purchased certain types of machining devices to access this database and store their respective device-related data, in particular machining-specific parameters, in this database. In this way, it is made possible that device-related data is not only exchanged within a company (of a customer), or can be forwarded unilaterally by a customer to a machine manufacturer for maintenance or development purposes, but rather that the device-related data can be collected and exchanged among all customers or operators of a machine manufacturer or also of a competence cluster. This drastically increases the amount of data available.

According to a preferred embodiment, the stored, available, and exchanged machining-specific parameters comprise at least one of the following parameters: type of workpiece, material to be processed, tool type, tool material, method parameters such as, for example, feed rate, rotational speed, cutting speed, cutting force, temperature, material amount, excipients and the like, surface quality, quality, tool life.

Operators of machining devices, preferably of the same type, are hereby able to exchange machining-specific parameters with each other in a simple manner. This enables, for example, an operator who wants to process a material that is new to him with a specific tool on a specific machining device, to research the database to see whether the same or similar material has already been machined by another operator. If yes, the operator can obtain indications regarding the machining parameters such as feed rate, rotational speed, cutting speed and the like. This makes it easier for the operator to achieve the desired result more quickly.

Accordingly, the machining-specific parameters stored in the database are preferably parameters with which an optimum machining result can be achieved. An optimum machining result is to be understood as a desired product quality that can be reproducibly achieved even under slightly fluctuating material properties. Preferably based on optimized machining parameters (such as maximum cutting speed, minimum material input, etc.).

In this respect, it is also conceivable to equip the database with an evaluation system that enables individual operators or workstations to evaluate the stored parameters. I.e. to assess how satisfied the operator is with the achieved result based on the stored machining-specific parameters. This makes it easier for other operators who are looking for suitable parameters to quickly identify which stored data gives good results and which ones give rather unsatisfactory results.

According to a preferred embodiment, the respective workstations have a unique means of identification compared to the main computer, in particular an identification code, via which the main computer can uniquely assign device-specific data received by the main computer from the respective workstation.

Preferably, the device-related data stored by one of the workstations in the database will be made anonymously available to the other of the two workstations. It is also possible to manage the data completely anonymously in order to rule out any risks of data theft.

Moreover, the device-related data stored in the database cannot be made available directly to other operators (users) or workstations, but rather only in the form of average values or interpolated values. This offers the advantage that the database can be filled between individual parameter values, and thus more data sets can be offered to the individual operator. Therefore, if device-specific data regarding, for example, a specific material with a specific milling tool of 10, 15 and 20 mm diameter, the database can automatically determine the values for diameters of 10 to 20 mm and add the missing values for diameters of 11, 12, 13, 14, 16, 17, 18 and 19 mm.

Furthermore, there is possibility that the respective workstations transmit the device-specific data to the main computer automatically and/or at the instruction of an operator or user of the corresponding machining device.

If the data is automatically read out from the workstation and transmitted to the main computer, this has the advantage that a large amount of device-related data is transmitted to the main computer, allowing the main computer to quickly build up a large data collection and thus can quickly fill the database with a wealth of data. However, this requires the main computer to process and evaluate a large volume of data. In particular, it is necessary to evaluate the available data with regard to its integrity in order to provide the individual operators or workstations with reliable data. Accordingly, the variant in which data is only transferred if the operator expressly requests it offers the advantage that data is only transferred if a good result could be achieved, which increases the quality of the existing data. On the other hand, there is a risk here that data will only be collected slowly since the operator is responsible for the data transmission himself and possibly often refrains from doing so.

According to a further embodiment of the present invention, the workstation can therefore determine whether the performed workpiece machining is a stable machining (i.e. in which an optimum machining result can be achieved) or not, based on device measurement values such as, for example, drive load, vibrations on the tool and/or on the device, feed rate and the like detected by the machining device, and can accordingly transmit the detected machining-specific parameters to the main computer or not.

In this way, it is possible to automate the transmission of the device-related data, in particular the machining-specific data, without flooding the main computer with data that does not lead to any good results. There is also the possibility here that the workstation determines on the basis of the detected device measurement values, such as for example low vibrations, whether the last performed machining process is a machining with good results, and if so, it requests that the operator transmit the data. This can minimize the additional effort for the operator, yet can still ensure that as much data as possible is collected.

A comparison with the database of the main computer is preferably carried out here. I.e. if the workstation detects that the last performed machining process is a machining that led to a good result, the workstation researches in the database whether there already is a data set for this parameter pairing and only then, if no data set exists yet, requests the operator to transmit the data to the main computer. This further reduces the effort for the operator of the machining device.

According to a further embodiment of the present invention, a user who is an operator of a machining device, or a workstation can search the database provided by the main computer for machining-specific parameters in the following categories: tool type, tool number, product data such as, for example, material, workpiece dimensions, strength, device type, manufacturer and the like. This makes it possible to carry out a targeted search specifically on the basis of known data and to find the required data as quickly as possible.

Furthermore, there is the possibility of allowing an operator of one of the machining devices, after the extraction of machining-specific parameters from the database stored in the database by another operator and thus shared, to evaluate them after successful use. I.e. if an operator has taken a data set from the database and used it for his own machining of a workpiece and was thus able to achieve a good or a bad result, he can share these experience values with other operators in the database. This improves the integrity of individual data sets in the database, and it consequently makes it easier for other operators to find trusted data sets.

The system can also provide an operator with the possibility of linking his machining-specific parameters (data set) with another data set already stored in the database by another operator. This provides the opportunity to save alternative suggestions by other operators in the database and to identify them.

According to a preferred embodiment of the present invention, an automatic transmission of device-related data, in particular machining-specific parameters, to the main computer only then takes place if vibration values at the machining device are below a preset threshold value. Since high vibration values on the machining device are usually due to unstable machining, it can be assumed with a high degree of probability that the machining-specific values do not lead to an optimum result and are therefore probably a test run, and therefore the values should not be transmitted. In this way it is possible to prevent unnecessary or bad data from being transmitted to the main computer.

Furthermore, the present invention relates to a method for sharing device-related data by means of remote data transmission, in particular machining-specific parameters, of machining devices, in particular wood machining devices for machining workpieces preferably consisting at least in sections of wood, wood material, synthetic material and/or glass, in particular by means of the above-described system, with the method comprising: Creating a database in which the device-related data can be managed, storing device-related data of a first machining device in the database, and making the device-related data stored by the first machining device in the database available to at least one further machining device.

BRIEF DESCRIPTION OF THE DRAWINGS

FIG. 1 schematically shows the structure of a system for sharing device-related data by means of remote data transmission according to an embodiment of the present invention.

DETAILED DESCRIPTION OF THE PREFERRED EMBODIMENTS

In the following, preferred embodiments of the present invention are described with reference to the accompanying drawing. Further variants and modifications of individual features cited in this context can each be combined with one another in order to form new embodiments.

FIG. 1 shows schematically the structure of a system 1 for sharing or exchanging device-related data by means of remote data transmission according to an embodiment of the present invention. As can be further seen from Fig., according to one embodiment of the present invention, the system 1 has a main computer 15 which is also called "Host" and at least two workstations 20, 25, which are also called "Client". The shown embodiment example relates to two workstations 20, 25, two different machining devices 30, 35, and a tablet (Client III). The main computer 15 provides a database 10 in which the device-related data of the individual machining devices 30, 35 can be stored and managed. In order to be able to store the device-related data in the database, the two workstations 20, 25 are connected to the main computer 15 via data communication connections, with the data exchange preferably being encrypted. The main computer 15 is used to create a "cloud" which the individual "clients" can access via remote data transmission (RDT) and thereby share or exchange their device-related data in a cloud-based manner. If an operator or a workstation of one of the two machining devices 30, 35 then wishes to store device-related data in the database 10, the desired data is transmitted via the data communication connection to the main computer 15 ("Cloud") which receives the transmitted data, verifies it and, if necessary, prepares it so that it can be stored in the database 10. The main computer 15 then stores the data in the database 10 and releases the stored data. It is thereby possible that, for example, the workstation 20 of the machining device 30 stores device-specific data in the database 15 and it is consequently made accessible to the operator or workstation 25 of the machining device 35.

In this respect, it is also possible to use other devices such as desktop PCs, mobile devices, laptops, tablets, smartphones, etc. to visualize the data stored in database 10.

As can be further seen from FIG. 1, according to the shown embodiment, only the main computer 15 has direct access to the database 10, the individual workstations 20, 25, or "Clients" must always go through the main computer 15. This prevents inadvertently storing incorrect data in the database 10 or, in the worst case, it is damaged. In this way there is also the possibility that the data transmitted by the individual work computers 20, 25 can be processed. Thus, it is possible, for example, that the main computer 15 checks the transmitted data to see whether similar data is already stored in the database 10, and if so, compares them with one another. Such a type of data comparison makes it possible to improve the integrity of the provided data. In this context, it is also possible for the main computer 15 to define certain tolerance ranges within which threshold values are considered equal. Such a type of tolerance range makes it possible to reduce the plurality of stored data sets while increasing integrity at the same time. In detail, this means that if, for example, two different operators have performed two identical machining operations, with almost identical machining-specific parameters, and, for example, only the rotational speeds differ from one another by 10%, the data sets are evaluated as being identical and are stored as only one data set, optionally as an averaged data set. Since in this case a data set was stored by two different operators, it is more likely that the data is reliable, which improves integrity.

On the other hand, if an operator is faced with the problem that he has to machine a new type of material that he has not yet machined on his machining device 30, 35, he can search the database 10 for suggestions for optimum setting values before starting the first test runs. If the operator finds what he is looking for in the database 10, he can use the suggested values for a first test attempt and, if necessary, further refine or improve the settings. The operator then has the possibility of optionally saving his improved setting values or machining-specific data in the database 10 as an alternative suggestion. If a third operator is confronted with a similar problem, he can refer back to two suggestions and, if used successfully, evaluate one or both suggestions, further improving the integrity of the suggestions over time.

Since it is possibly too time-consuming for the individual operators of the machining devices 30, 35 to input the respective machining-specific parameters into a mask for transmitting the data to the main computer 15, there is also the possibility of automatically transmitting the data to the main computer 15. In this case, it is also further possible that the workstation 20, 25 of the machining device 30, 35 makes a preselection in order to reduce or optimize the amount of data to be managed by the main computer 15. Here, for example, it is possible that the workstation 20, 25 only transmits machining-specific values to the main computer 15 which are reproducible, i.e. which have already been determined several times. Since in such cases it can be assumed that this is not a test, but rather a stable manufacturing process. With regard to the evaluation of the available machining-specific data, it is also possible to access measurement values at the machining device 30, 35, such as vibrations at the tool and/or at the device, drive load and the like. For example, automatic transmission of the data to the main computer 15 can be dispensed with if the vibration values at the machining device 30, 35 are above a certain threshold value.

The invention claimed is:

1. A system for sharing device-related data using remote data transmission, of wood machining devices, for machining of workpieces consisting at least in sections of wood, wood material, synthetic material and/or glass, comprising:
   a main computer for creating and providing a database in which the device-related data is to be managed;
   a first workstation of a first machining device, the first workstation for connecting to the main computer via a data communication link; and
   a second workstation of a second machining device, the second workstation for connecting to the main computer via a data communication link,
   wherein at least one of the first and second workstations is configured to cause the device-related data to be stored in the database of the main computer, the main computer making the device-related data available to the other of the first and second workstations,
   wherein the device-related data comprises machining-specific parameters, which comprises at least one of the following parameters: a type of workpiece, a material to be processed, a tool type, a tool material, or method parameters, wherein the method parameters comprise a feed rate, a rotational speed, a cutting speed, a cutting force, a temperature, a material amount, excipients, a surface quality, a quality, or a tool life, and
   the device-related data are optimized machining-specific parameters with which an improvement of the machining quality can be achieved,
   wherein the first or second machining device including the at least one of the first and second workstations comprises at least one workpiece detection device for detecting workpiece parameters comprising elasticity modulus, density, thickness, or layer thickness,
   wherein the first or second machining device is configured to detect the device measurement values comprising drive load, vibrations at a tool and/or at the first machining device, or a feed speed,
   wherein at least one of the first and second workstations is configured to determine, based on the device measurement values, whether workpiece machining carried out is a stable machining or not, and accordingly whether to request the operator to transmit the machining-specific parameters to the main computer or not,
   wherein the transmission of device-related data to the main computer only then taking place if vibration values at the machining device are below a present threshold value.

2. The system according to claim 1, wherein the main computer is a web server which has a World Wide Web address and is configured to create an internet connectivity for transmission of the device-related data between the first and second workstations.

3. The system according to claim 1, each of the first and second workstations having a unique means of identification compared to the main computer, via which the main computer is configured to uniquely assign device-specific data received from the respective workstation.

4. The system according to claim 1, the device-related data stored by one of the first and second workstations in the database being made anonymously available to the other of the first and second workstations.

5. The system according to claim 1, the device-related data stored in the database being not made directly available to the other of the first and second workstation, but rather being provided in a form of average values or interpolated values.

6. The system according to claim 1, the database provided by the main computer being searchable based on one or more of the following categories: a tool type, a tool number, and a product data, wherein the product data comprises a material, workpiece dimensions, a strength, a device type, and a manufacturer.

7. The system according to claim 1, data sets stored in the database being able to assessed with regard to their integrity.

8. The system according to claim 1, data sets being able to be linked with one another in the database in order to be able to store different alternative proposals.

9. Use of the system for sharing the device-related data using the remote data transmission according to claim 8 in order to make available to a user of the first machining device, the machining-specific parameters of the second machining device.

10. A method for sharing the device-related data using the remote data transmission, of the machining devices for machining the workpieces by means of the system according to claim 1, the method comprising:
   creating the database in which the device-related data is to be managed;
   storing the device-related data of the first machining device in the database; and
   making available to at least one further machining device, the device-related data stored by the first machining device in the database.

11. The method according to claim 10, wherein a transmission of the device-related data between a web server and at least two machining devices is configured to occur via a remote data transmission.

\* \* \* \* \*